United States Patent [19]

Spain

[11] 3,724,612
[45] Apr. 3, 1973

[54] REFURBISHABLE BRAKE DISC

[76] Inventor: Raymond G. Spain, 4805 Metcalf Drive, Raleigh, N.C.

[22] Filed: Mar. 1, 1971

[21] Appl. No.: 119,773

[52] U.S. Cl................................188/218 XL, 192/70.13
[51] Int. Cl................................................F16d 65/12
[58] Field of Search... 188/250 G, 218 XL, 73.2, 251 A; 192/107 R, 70.13

[56] References Cited

UNITED STATES PATENTS 1,969,775  8/1934  Bragg.................................188/218 R
3,552,533  1/1971  Nitz...................................188/251 A X

FOREIGN PATENTS OR APPLICATIONS 1,105,370  3/1968  Great Britain................188/218 XL Primary Examiner—George E. A. Halvosa
Attorney—Vance A. Smith, Anthony L. Stewart and Neal E. Willis

[57] ABSTRACT

A brake disc is provided with a recess in the region which normally frictionally contacts an adjacent disc. A removable insert complementary to said recess is placed therein, rotated, and locked against further rotational movement within the recess. Inserts worn due to use may be replaced with new inserts.

6 Claims, 4 Drawing Figures

PATENTED APR 3 1973   3,724,612

INVENTOR.
RAYMOND G. SPAIN
BY Vance A. Smith
ATTORNEY

REFURBISHABLE BRAKE DISC

FIELD OF THE INVENTION

The present invention relates to an all-carbon brake disc and, particularly, to an all-carbon brake disc having a removably secured frictional insert.

BACKGROUND OF THE INVENTION

Due to the increased size and landing speeds of modern aircraft, much emphasis is being placed upon the development of superior brakes to reduce the motion of the aircraft. Aircraft ordinarily employ disc brakes which function like a pedal-actuated bicycle brake consisting of a stack of alternating rotors and stators.

Carbon composites are receiving attention as a structural material for disc brakes. One innovation depicts an all-carbon brake using laminations of graphite cloth. Still another recent innovation depicts an all-carbon brake with continuous graphite fibers to strengthen the periphery regions which ordinarily experience high shear stresses in operation. The continuous graphite fibers extend along the contour of the periphery regions which is also the general direction of the shear stresses. Results obtained from evaluation of all-carbon discs utilizing continuous graphite fibers have shown sufficient improvement in resistance against delamination.

When brake discs have worn a specified amount due to the frictional forces, the worn disc is usually discarded. It would be particularly attractive for users of brake discs if the discs were refurbishable in the regions of wear. It is therefore a primary object of the present invention to provide for an improved all-carbon brake disc which is refurbishable in the worn regions.

BRIEF STATEMENT OF THE INVENTION

In accordance with the present invention, a brake disc is recessed in the region which would normally come in frictional contact with an adjacent brake disc when the brake is in operation. An insert with a configuration complementary to the recess is placed in the recess in a first position. The configuration of the insert and recess are constructed in a manner such that the insert locks or is secured within the recess when the insert is rotated to a second position. Generally, this locking feature occurs in the direction of rotation.

When the insert wears due to continual use, it is replaced with a new insert. In one embodiment, the recess is on one side of the disc. Successive inserts may be provided with predetermined increasing thickness to compensate for the wear on the facing side of the adjacent disc. In still another embodiment, recesses are provided on both sides of the disc to permit placement of dual inserts.

DESCRIPTION OF THE DRAWINGS

The features of the present invention are pointed out with particularity in the appended claims. The invention itself together with further objects and advantages thereof, may be best understood with reference to the following description taken in connection with the drawings in which:

DESCRIPTION

Figure 1:
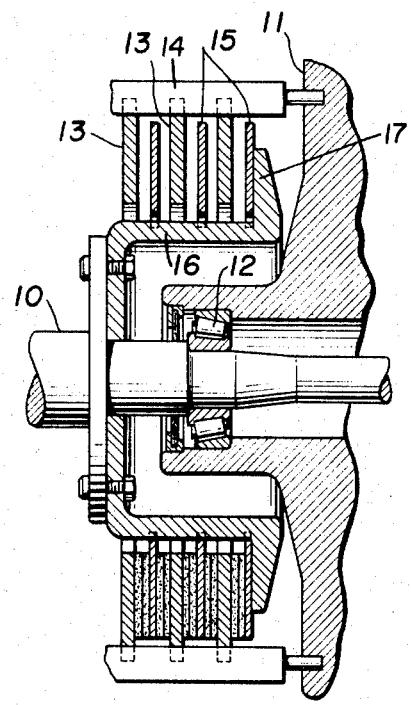
FIG. 1 is a simplified view, partly in section, of a typical aircraft brake system.

FIG. 1 illustrates a conventional aircraft brake assembly including horizontal axis 10 and wheel 11 journaled through roller bearings 12 to axis 10, a plurality of annularly disc-shaped rotor discs 13 which are keyed or splined to wheel 11 via member 14 and a plurality of stator discs 15 which are keyed or splined to stationary axle 10 via member 16.

Discs 13 and 15 are positioned in alternating sequence and are adapted to be compressed against one another through plate 17 and a hydraulically actuated pressure mechanism (not shown).

The rotor and stator discs are preferably comprised of an essentially all-carbon composite which includes continuous carbon or graphite fibers (carbon being employed hereinafter as generic to both) in a carbonaceous matrix. Copending application Ser. No. 866,116 of R. G. Spain filed Oct. 8, 1969 now U.S. Pat. No. 3,639,197, discloses such a structure in which the carbon fibers follow the contour of the periphery in the regions adjacent the splines of the rotor and stator discs.

One of the economic problems associated with brake discs is the necessity to discard the entire disc when a certain amount of frictional wear has occurred. This is true even though the disc experiences wear only in the regions which contact regions of adjacent discs. The improved disc of the present invention, however, provides a solution to this problem.

Figure 2:
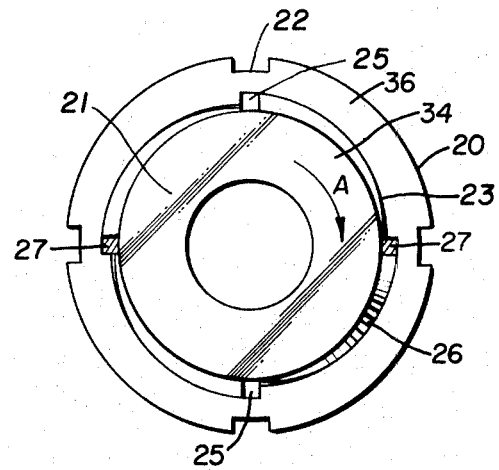
FIG. 2 is a plan view of a brake disc in accordance with one embodiment of the present invention.

The brake disc depicted in FIG. 2 comprises an annular insert housing 20 and an annular insert 21. For descriptive ease, the housing 20 is illustrated as a splined rotor showing rotor lugs 22. Housing 20 is provided with a recess 37 separated from a planar surface 36 by a shoulder 29. The shoulder 29 is complementary to the configuration of the periphery of the annular insert 21. The inner diameter of insert 21 can be greater than that of housing 20 although the diameters shown are the same size. Although other configurations may be used as well, insert 21 is provided with four curved or cam-like surfaces 23. The beveled side 26 of the insert 21 in housing 20 may best be seen in FIG. 3 which is a cross-section of the disc of FIG. 2. Side 26 is beveled inwardly to complement the outwardly beveled edge of shoulder 29 of the housing 20. Upon rotation of insert 21 in direction of the arrow A, the cam surfaces abut against the shoulder 29 of housing 20 at a number of points thereby locking insert 21 against axial movement away from disc housing 20 and preventing further rotation of the insert. In operation (generally forward motion of the vehicle), the frictional force exerted on the frictional insert is in the direction of abutment. To prevent unlocking in the case of reverse rotation, such as when an aircraft is moved backward, one or more plugs 27 of appropriate material may be positioned in the vacancy 25 developed by rotation of the insert and thereby provide simultaneous frictional engagement upon rotation of the annular disc in either direction. In the case of all carbon brake discs, it is preferable to use carbonizable material as the plug and convert it to carbon by pyrolysis. When the insert is worn, the plug is mechanically removed and the insert is removed.

Figure 3:
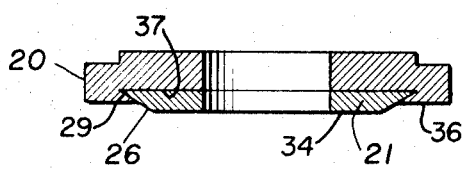
FIG. 3 is a cross-sectional view of the disc of FIG. 2.

FIG. 3 also illustrates a friction surface 34 of the insert 21 which protrudes axially from the planar surface 36 of the disc housing 20 this ensures that the planar surface 36 of housing 20 about the recess does not contact an adjacent housing surface during operation. After a predetermined amount of wear on the insert frictional surface 34, the plugs 27 are removed and the insert is discarded. A new insert is then positioned within the housing recess and rotated until the sides abut and are locked. Due to wear on the adjacent disc face, it is preferable that succeeding inserts be of increased thickness to compensate for the wear.

Figure 4:
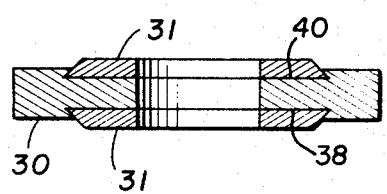
FIG. 4 is a plan view of a brake disc in accordance with another embodiment of the present invention.

FIG. 4 illustrates another embodiment of the present invention in which disc housing 30 is provided with two recesses 38 and 40, one on each side of housing 30 adapted to received complementary inserts 31. The locking and abutting features are similar to that shown in FIGS. 2 and 3. The disc housing 30 thus experiences no frictional wear from contact with adjacent discs.

The following example is provided as a preferred technique of fabricating the improved brake disc of the present invention.

EXAMPLE

Initially a carbon fiber such as, for example, that obtainable from Hitco Materials, Division of H. I. Thompson Company, Gardena, California, under the stock designation HMG-50, or a PAN derived fiber, may be coated with a resin material containing powdered graphite to give a resin-fiber-powdered graphite weight ratio of about 40:45:15. The resin solution may be of any resin which yields a carbonaceous residue upon pyrolysis. For example, I have found it convenient to utilize a mixture comprised of the following materials: approximately 64.5 percent by weight of a phenolic varnish such as DP-25-10 (obtainable from the Ironsides Co., Columbus, Ohio); 12.4 percent by weight of a particulate carbon composition such as graphite powder stock designation SW 1651 (from the South West Graphite Co., Burnette, Texas); and methylethyl ketone of approximately 23.1 percent by weight. The ketone acts as thinner to give the solution a workable consistency and is removed during a subsequent drying operation.

The coated fiber is fed to a rotating cylindrical mandrel at an appropriate speed, e.g., 100 feet per minute. It is preferred, as explained below, that the fiber be wound helically across the drum as well as around the circumference thereof. To ensure that the resin does not adhere to the mandrel, it is convenient to cover the mandrel with an appropriate release paper prior to winding.

Removing the solvent is accomplished by drying the resin-fiber band on the mandrel while rotating slowly in air at room temperature. Any residual solvent may be removed by placing the band in an oven at about 150°F. for several hours and by placing the resin-fiber band in a vacuum at room temperature for several hours.

The band is removed from the mandrel, heated to a softened state, and forced into a preform. The preform has the same general shape as the final splined peripheral shape of the desired article, e.g., a rotor housing having lugs about the outer periphery cam surfaces and appropriately beveled, cam-like curved edges about the recess. The remaining volume of the preform is filled with an appropriate mixture of fiber, which could be either staple or continuous, powdered graphite (particulate carbon), and resin (yielding a carbonaceous residue upon pyrolysis). Another preform having the same general shape as the insert including beveled edges and cam surfaces is filled with the mixture. It should be noted at this point that the insert may be formed without a separate continuous band, and that continuous fiber may be substituted for staple fiber in both the housing and the insert.

The now substantially planar preform-shaped rotor housing and insert are placed into molds having approximately the final desired shape. A force generating a pressure on the order of 3,000 pounds/square inch is applied normal to the rotational plane(s) of the winding of the housing. This is necessary in order that windings in the final state will have the desired preferred direction. The insert article is also subjected to similar pressure.

It is preferred that the preforms be made with a smaller outer diameter and a larger internal diameter than the molds to facilitate placement of the housing and inserts therein. The axial pressure imposed against the housing and insert causes both to fill the final mold and closely follow the contours thereof. The carbon fibers of the housing are practically inelastic and must of necessity possess some freedom of movement in order that the band may readily follow the contours of the housing preform mold and subsequently the final mold. By helically or sinuisoidally winding the fiber on the rotating mandrel, a geometric configuration of winding is presented which permits the needed fiber movement during molding.

The molded housing and insert are pyrolyzed at approximately 1,800°C. for about eight hours until both become essentially all-carbon composites (99 percent carbon or greater). To ensure that porosity resulting from shrinkage is minimized, the molded article may be repeatedly reimpregnated with, for example, catalyzed furfuryl alcohol and then repyrolyzed. The housing and insert are then finished and machined to appropriate tolerances. Finally, the housing and insert are fitted together and rotated into a locked position. The vacancies formed upon rotation are then filled with carbonizable material and pyrolyzed up to approximately 1,800°C.

Although the description has been limited to particular embodiments of the present invention, it is thought that modifications and variations would be obvious to one skilled in the art in light of the above teachings. It is understood, therefore, that changes may be made in the features of the present invention described herein which fall within the full intended scope of the invention as defined by the following claims.

What I claim is:

1. A friction disc for use in a brake assembly comprising:
   a splined annular disc having a first recessed portion on a first side of said disc, said first recessed portion being separated from a first planar surface by a first shoulder, said first shoulder having a first plurality of cam surfaces thereon;

a first annular insert having a first peripheral surface thereon and located in said first recessed portion of the splined annular disc, said first peripheral surface being substantially concentric to said first cam surfaces, said first annular insert being rotated from a first position to a second position where the first peripheral surface will abuttingly engage the first cam surfaces to prevent further independent rotation of the first annular insert, said first annular insert upon rotation from the first position to the second position creating a first plurality of first vacancies between the first peripheral surface and the cam surfaces, said first annular insert having a first friction surface protruding axially above the first planar surface of said annular disc; and a first plurality of plugs located in said first vacancies to maintain said first annular insert in said second position, said first friction surface of the first annular insert being adapted to simultaneously engage a corresponding mating friction surface during a brake application.

2. The friction disc as recited in claim 1 wherein said first peripheral surface and said first cam surfaces are complementary beveled to prevent said first annular insert from moving axially when held in said second position by said first plurality of plugs.

3. The friction disc as recited in claim 2 wherein said annular disc further includes:

a second recessed portion on a second side of said disc, said second recessed portion being separated from a second planar surface by a second shoulder, said second shoulder having a second plurality of cam surfaces thereon.

4. The friction disc as recited in claim 3, further including:

a second annular insert having a second peripheral surface thereon and located in said second recessed portion of the splined annular disc, said second peripheral surface being substantially concentric to said second cam surfaces, said second annular insert being rotated from a first position to a second position where the second peripheral surface will abuttingly engage the second cam surfaces to prevent further independent rotation of the second annular insert, said second annular insert upon rotation from the first position to the second position creating a second plurality of vacancies between the second peripheral surface and the second cam surfaces, said second annular insert having a second friction surface protruding axially above the second planar surface of said annular disc; and a second plurality of plugs located in said second vacancies to maintain said second annular insert in said second position, said second friction surface of the second annular insert being adapted to simultaneously engage a corresponding second mating friction surface during a brake application.

5. The friction disc, as recited in claim 4 wherein the annular disc, the first annular insert and the second annular insert are essentially all carbon composites.

6. The friction disc, as recited in claim 5, wherein the first and second plurality of plugs are composites derived from a pyrolyzed carbonaceous material.

* * * * *